L. W. CHUBB.
METHOD OF AND MEANS FOR TESTING ELECTRICAL APPARATUS.
APPLICATION FILED SEPT. 12, 1910.
1,170,608.
Patented Feb. 8, 1916.
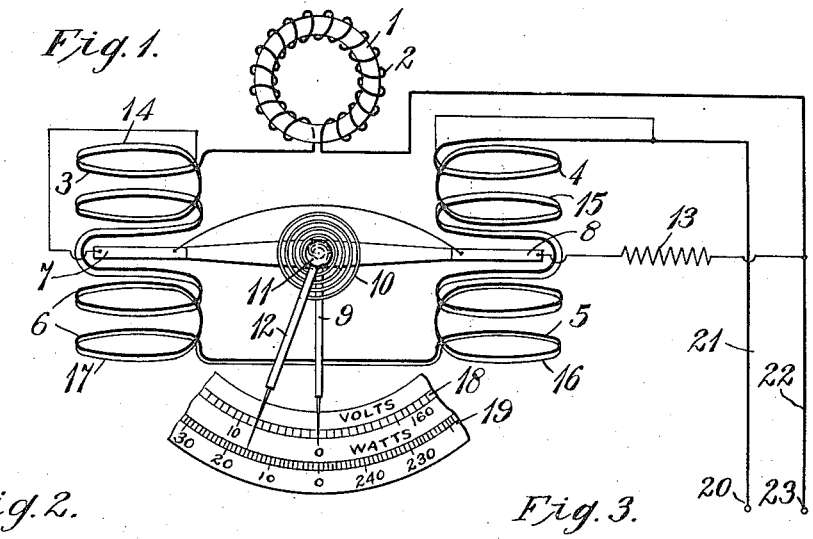
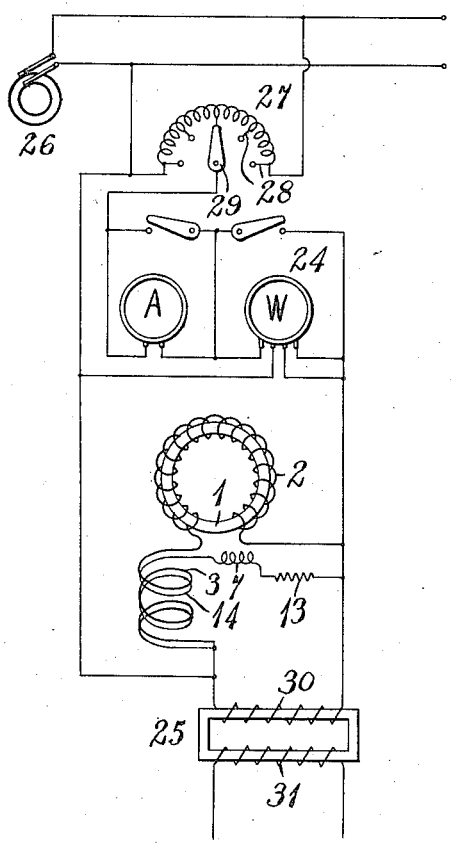
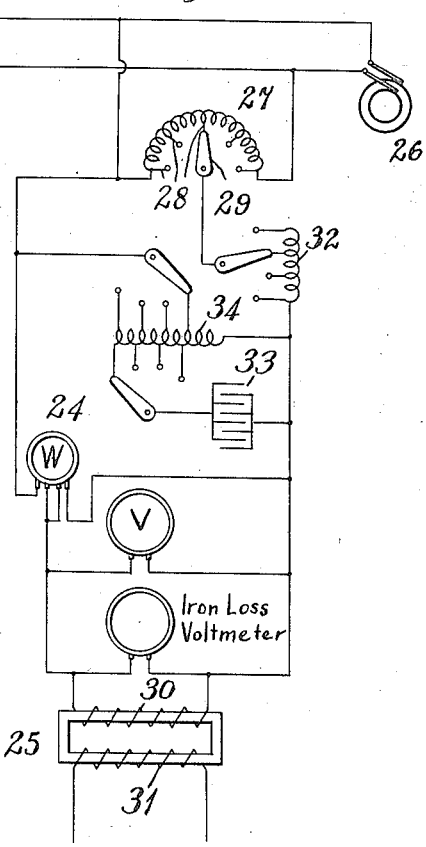
WITNESSES:
INVENTOR
Lewis W. Chubb
BY
ATTORNEY

UNITED STATES PATENT OFFICE.

LEWIS W. CHUBB, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF AND MEANS FOR TESTING ELECTRICAL APPARATUS.

1,170,608.   Specification of Letters Patent.   Patented Feb. 8, 1916.

Original application filed May 24, 1909, Serial No. 497,972. Divided and this application filed September 12, 1910. Serial No. 581,734.

*To all whom it may concern:*

Be it known that I, LEWIS W. CHUBB, a citizen of the United States, and a resident of Wilkinsburg, in the county of Allegheny and State of Pennsylvania, have invented a new and useful Improvement in Methods of and Means for Testing Electrical Apparatus, of which the following is a specification, this application being a division of application, Serial No. 497,972, filed May 24, 1909.

My invention relates to methods of testing electrical apparatus and particularly to methods of testing transformers and it has for its object to provide a simple method of this character for determining the iron or core losses in the apparatus under test.

My testing method preferably involves the use of a measuring instrument such as that illustrated and described in my co-pending application, Serial No. 497,972, filed May 24, 1909, of which this application is a division, and consists, broadly, in supplying alternating current energy to one of the transformer windings under test, varying the form factor of the applied electromotive force to cause it to correspond to that of a sine wave, varying the voltage of the supply circuit to the standard voltage of the winding and measuring the power supplied thereto.

Since the performance guaranteed by the transformer manufacturers is generally based on a sine wave, it is desirable to provide a simple method of testing by means of which the core loss, which would be obtained on a sine wave, may be indicated directly, irrespective of the wave form of the circuit used to supply the losses.

The aforesaid result is accomplished by the use of a voltmeter which, when connected to a testing circuit, indicates directly the square-root-of-the-mean-square of the instantaneous electromotive forces of a sine wave, which would cause the same loss in a transformer as the electromotive force wave of the circuit to which the instrument is connected. With this instrument, therefore, the sine wave loss may be obtained, on any reasonably distorted wave, without knowing the form factor, or the amount of distortion.

The total losses in transformer cores are made up of a hysteresis loss, which depends upon the average value of the impressed voltage, and an eddy current loss, which is dependent upon the square-root-of-the-mean-square, or the effective value of the impressed voltage. If, therefore, a transformer is tested on a peaked wave, for instance, and the usual form of voltmeter, indicating root-mean-square values, is used, the eddy current loss would be correct and the hysteresis loss too low, thus giving a total loss lower than the sine loss for the required voltage. If a voltmeter which indicates average volts should be used, and a test made at the average value of the rated sine voltage, a correct hysteresis loss would be obtained, but the eddy current loss would be too high, thus giving a total loss which would be too high.

The instrument which I employ indicates a variable voltage which is such a function of both the average and the square-root-of-the-mean-square values of the instantaneous electromotive forces that the error in the hysteresis losses is equal to and opposite to the error in the eddy current losses. Therefore, the total measured loss is correct and equal to the loss which could be obtained on the sine wave or voltage.

This instrument, which is set forth in my aforesaid co-pending application, Serial No. 497,972, comprises, in general, a closed magnetic circuit of iron preferably built up of a series of thin ring punchings having a relation of eddy and hysteresis losses corresponding to that in the usual transformer core. If this relation of losses in the transformer core and in the instrument core agree, the instrument readings should be exact. However, if the instrument is used in connection with transformers or other devices having cores in which the relation of eddy to hysteresis losses is not the same as in the core of the instrument, some inaccuracy would ordinarily result.

It is the specific object of this invention to provide a method and means whereby the aforesaid instrument may be caused to give strictly accurate results even though the ratios of eddy to hysteresis losses do not correspond in the two devices. This instrument is thereby rendered useful in connection with all transformers or other inductive devices irrespective of the relations of the losses in their iron cores.

Figure 1 of the accompanying drawings is a diagrammatic view of an iron loss voltmeter which I prefer to employ for carrying out my invention. Fig. 2 is a diagram showing the circuit connections of a system utilizing the iron loss voltmeter of Fig. 1, and adapted for practising my invention. Fig. 3 is a diagram of a slightly modified system.

Referring to the drawings, the iron loss voltmeter of Fig. 1 comprises a magnetizable core 1, a winding 2 associated therewith, stationary coils 3, 4, 5 and 6, movable coils 7 and 8, a zero-reading pointer 9 attached to the movable member, a spring 10 and an adjusting knob 11 for opposing the torque of the movable member, a pointer 12 attached to the knob 11, a resistance 13, auxiliary coils 14, 15, 16 and 17 by means of which the instrument is made to read the loss in both its shunt and its series circuits, and dials 18 and 19 which respectively indicate the voltage which would give the same loss in a transformer when tested on a sine wave, and the watts lost in the instrument itself.

A series circuit is established from one terminal 20 of the meter through conductor 21, stationary coils 4, 5, 6 and 3, winding 2 and conductor 22 to the opposite terminal 23 of the meter. A shunt circuit is established from conductor 21 through auxiliary coils 15, 16, 17 and 14, movable coils 7 and 8 and resistance 13 to the conductor 22. The auxiliary coils 14, 15, 16 and 17 have the same number of turns as the stationary coils 3, 4, 5 and 6 in order that the total losses in the instrument may influence the torque of the meter. Under these conditions, the dial 19, when properly calibrated, will correctly indicate the total loss in the iron loss voltmeter so that it may be readily and accurately ascertained and subtracted from the indication of the wattmeter 24 when the instrument is connected in circuit, as shown in Fig. 2 of the drawings. The fact that the losses in the instrument influence its voltage reading does not introduce any error because these losses are taken into account in proportioning the total hysteresis to the total eddy current losses in the device. It will be observed that, with the arrangement shown, the shunt circuit of the meter measures the total potential drop and, at the same time, the series coil and the auxiliary coil (taken together, since both react on the movable coil) measure the total current in the meter.

Referring particularly to Fig. 2, a transformer 25, for which a test is desired, is connected to any suitable source of alternating current, such as single-phase generator 26, the voltage applied to the transformer being adjusted by means of an auto-transformer 27 having a plurality of taps 28 and a movable contact arm 29. One winding 30 of the transformer is connected across the circuit of the generator through the auto-transformer 27, one terminal of the winding being connected to the arm 29. The iron loss voltmeter is connected across the terminals of the winding 30 and the voltage coil of a wattmeter 24 is connected in multiple circuit with the iron loss voltmeter. A second winding 31 of the transformer 25 is open-circuited and the auto-transformer 27 is adjusted until the iron loss voltmeter indicates the standard voltage of the winding 30 of the transformer 25. When this point is reached, the watts lost in the iron loss meter are read on the dial 19 and the total watts lost in the voltmeter and in the transformer are read on the wattmeter 24, the difference between these two readings being the correct core loss, in watts, of the transformer 25.

By the Steinmetz formula, the hysteresis loss in iron, at constant frequency, varies substantially as the 1.6 power of the induction. This approximate exponent of 1.6 differs somewhat for different samples of sheet steel, such as are used in ordinary transformers, and varies at different values of magnetic induction in the same sample of steel. If the hysteresis exponents of the iron in the voltmeter and the iron in the transformer are not equal, there is, theoretically, an error introduced but, in no case, is this difference of exponents sufficiently great, in commercial transformers, to introduce appreciable errors.

When the relation of eddy to hysteresis losses in the apparatus under test is not the same as in the instrument, and when extreme accuracy is required, as in very careful laboratory tests, the arrangement shown in Fig. 3 may be employed, which will give a theoretically correct result. This method consists in correcting the form factor of the voltage waves to 1.11, which is the form factor of a sine wave, and then reading the loss. This is accomplished by introducing a variable inductance 32 in series with the supply circuit and connecting an aluminum electrolytic cell 33 across the circuit between the inductance and the wattmeter, an ordinary voltmeter being connected across the circuit in multiple with the iron loss voltmeter. The voltage impressed upon the aluminum cell may be varied over a wide range by means of an auto-transformer 34 connected across the circuit and having an adjustable primary connection, as well as an adjustable connection to the cell. The inductance tends to peak the wave of the line electromotive force and the aluminum cell, which is working above its critical voltage, short-circuits or filters out the peaks until the form factor is 1.11. That is to say, the effects of the inductance and the aluminum cell are opposed to each other, as far as the form factor is concerned, and, by adjusting the inductance 32 and the auto-transformer 34 until the readings of the iron loss voltmeter and the ordinary voltmeter agree, the form factor of the impressed electromotive force is made to correspond to a sine wave, being 1.11. While this method does not necessarily give a sine wave for the test, it gives a wave having the same form factor.

I claim as my invention:

1. The method of testing inductive apparatus which consists in so adjusting the form factor of the supply circuit that the power consumed in a calibrated inductive device at the standard voltage of the inductive apparatus corresponds to the iron or core loss in said device when connected to a supply circuit of the same voltage having a sine wave characteristic, connecting the inductive apparatus to said supply circuit, and determining the iron or core losses in the inductive apparatus.

2. The method of testing inductive apparatus which consists in so adjusting the form factor of the supply circuit that the power consumed in a calibrated inductive device at the standard voltage of the inductive apparatus corresponds to the iron or core loss in said device when connected to a supply circuit of the same voltage having a sine wave characteristic, connecting the inductive apparatus to said supply circuit, determining the total loss in the inductive apparatus and the inductive device, and subtracting therefrom the indicated losses in the calibrated inductive device.

3. The method of testing electrical apparatus which consists in applying to it an electromotive force of other than sine wave form but having substantially the same form factor as a sine wave, and making the desired measurements.

4. The method of testing electrical apparatus which consists in applying to it an electromotive force having an unknown wave form differing from that of a sine wave but having substantially the same form factor as a sine wave, and making the desired measurements.

5. The method of testing electrical apparatus which consists in deriving from a circuit having an unknown electromotive force wave of unknown form factor an electromotive force having an unknown wave form of substantially the same form factor as a sine wave, and applying the latter electromotive force to the device under test.

6. The combination with an electrical circuit, and apparatus to be tested, of means for adjusting the form factor of the electromotive force applied to the apparatus, means for indicating the effective value of the voltage applied to the apparatus, an instrument comprising an inductive device and a wattmeter for measuring the power consumed in the inductive device, the said instrument being connected between the terminals of said apparatus, and means for measuring the power consumed in the said apparatus.

In testimony whereof, I have hereunto subscribed my name this 8th day of Sept., 1910.

LEWIS W. CHUBB.

Witnesses:
THOMAS SPOONER,
B. B. HINES.